United States Patent
Iizuka

(10) Patent No.: US 6,751,712 B2
(45) Date of Patent: Jun. 15, 2004

(54) CIRCUIT AND METHOD FOR EXECUTING ACCESS CONTROL OF VIRTUAL CHANNEL MEMORY PREVENTING DETERIORATION OF DATA TRANSFER RATE

(75) Inventor: Hideo Iizuka, Niigata (JP)

(73) Assignee: NEC Corporation, Tokyo (JP)

( * ) Notice: Subject to any disclaimer, the term of this patent is extended or adjusted under 35 U.S.C. 154(b) by 131 days.

(21) Appl. No.: 09/969,994

(22) Filed: Oct. 4, 2001

(65) Prior Publication Data

US 2002/0042864 A1 Apr. 11, 2002

(30) Foreign Application Priority Data

Oct. 5, 2000 (JP) ........................................ 2000-305939

(51) Int. Cl.[7] .............................................. G06F 13/00

(52) U.S. Cl. ........................ 711/154; 711/158; 711/167; 711/203

(58) Field of Search ................................ 711/154, 158, 711/5, 167, 104–105, 203

(56) References Cited

U.S. PATENT DOCUMENTS 6,295,586 B1 * 9/2001 Novak et al. ................ 711/154
6,549,991 B1 * 4/2003 Huang et al. ............... 711/158

OTHER PUBLICATIONS

Ikeda, K., "Virtual Channel Memory", Effective Multiple Memory Mastering, Nikkei Micro Decives, Nikkei BP, Feb. 1, 1998, No. 152, pp. 142–149, No English Translation Provided.

* cited by examiner

Primary Examiner—Reba I. Elmore
(74) Attorney, Agent, or Firm—McGinn & Gibb, PLLC

(57) ABSTRACT

A VCSDRAM (Virtual Channel SDRAM) control circuit comprises an access request reception section, an access request storage section, a status comparison section, a state control section, a preceding command control section, a command generation section and an address generation section. Access requests to a VCSDRAM module which are supplied from memory masters are received by the access request reception section and stored in the access request storage section. The access request storage section generates foreground command request signals for each access request. The status comparison section compares each access request with the current status of the VCSDRAM module, judges whether background operation is necessary for the execution of the access request, and sends a background command request signal to the state control section if the background operation is necessary. The state control section receives the background command request signals and the foreground command request signals and arranges and orders the command request signals according to a predetermined standard. The ordered command request signals are supplied one by one to the command generation section and the address generation section, thereby commands and addresses are generated and supplied to the VCSDRAM module in an optimized order and thereby deterioration of data transfer rate is prevented.

19 Claims, 9 Drawing Sheets

F I G. 4
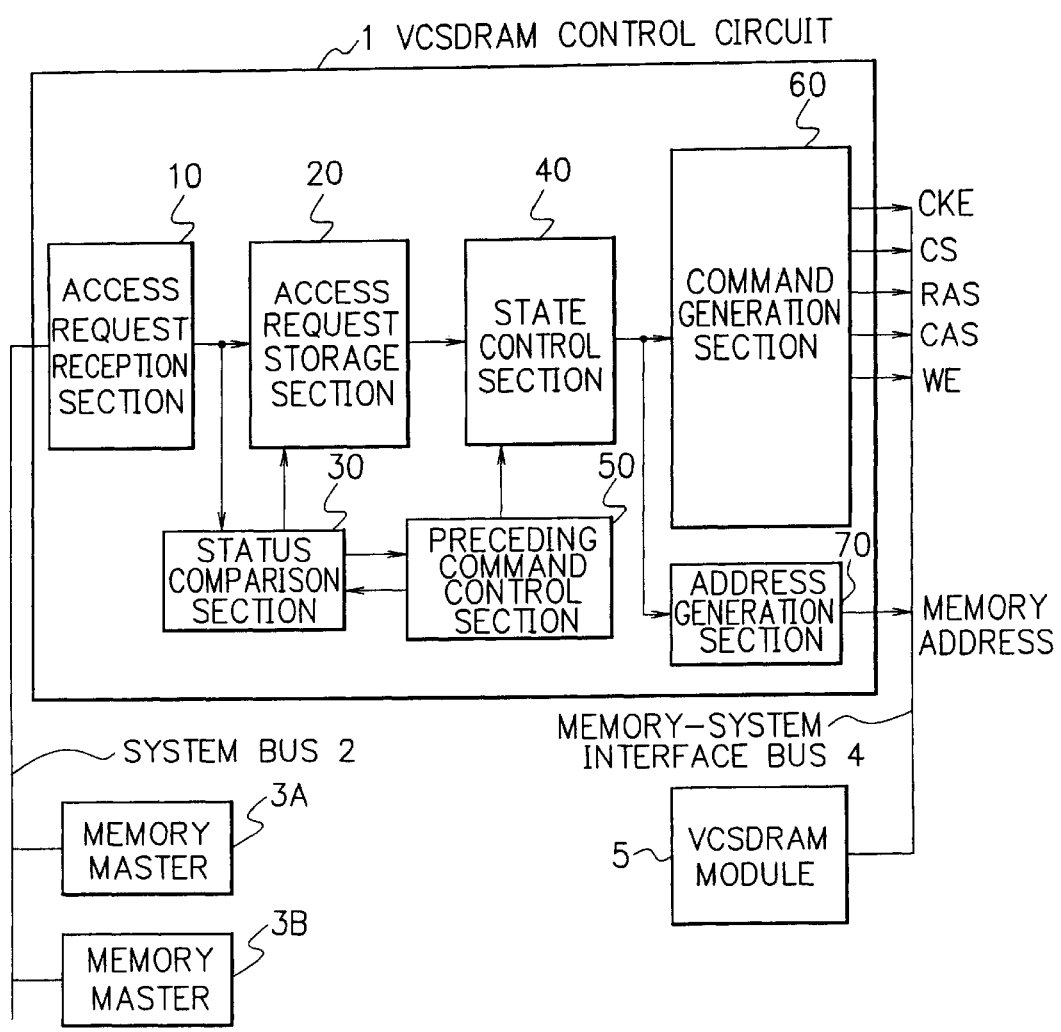

F I G. 7
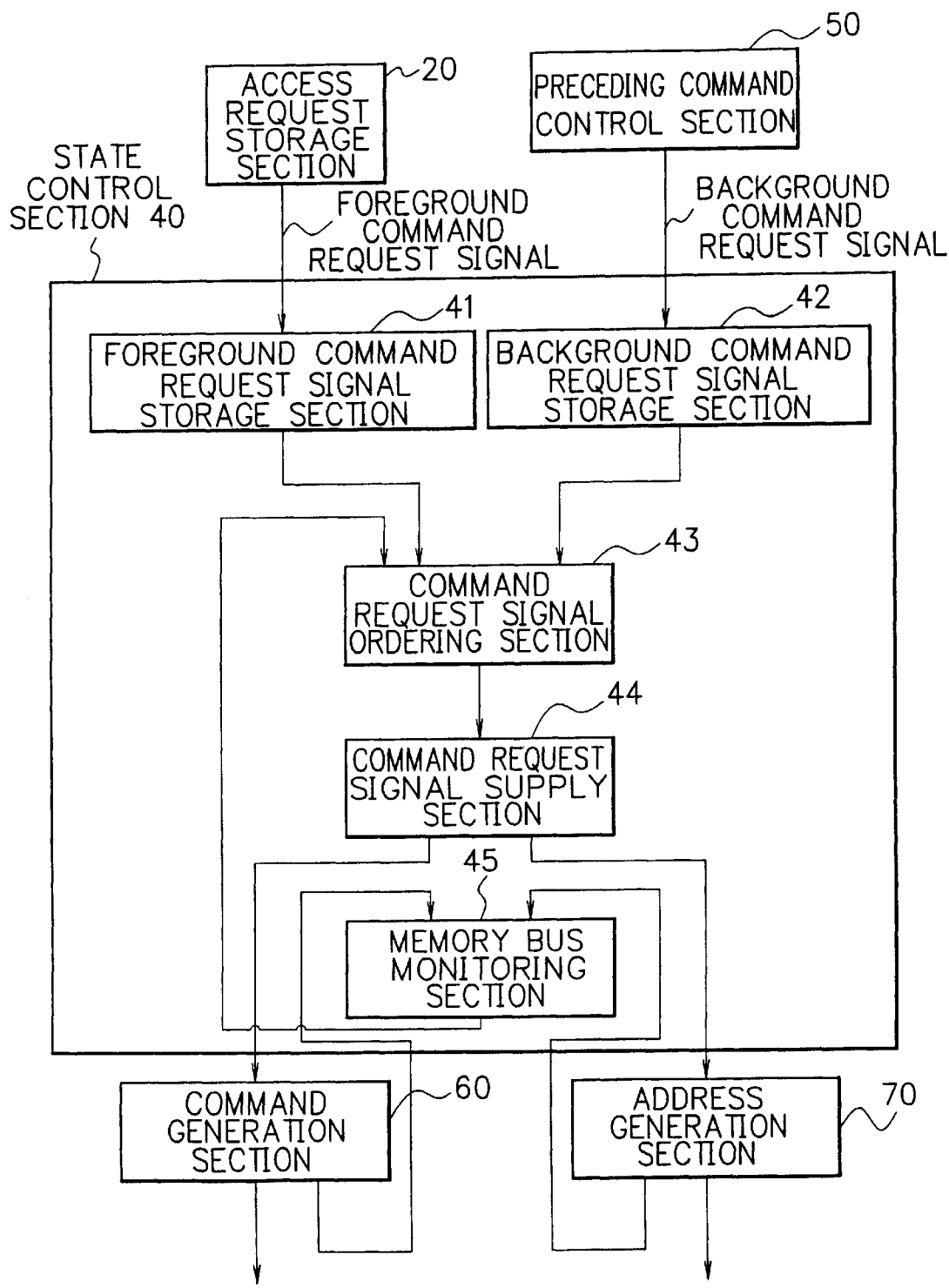

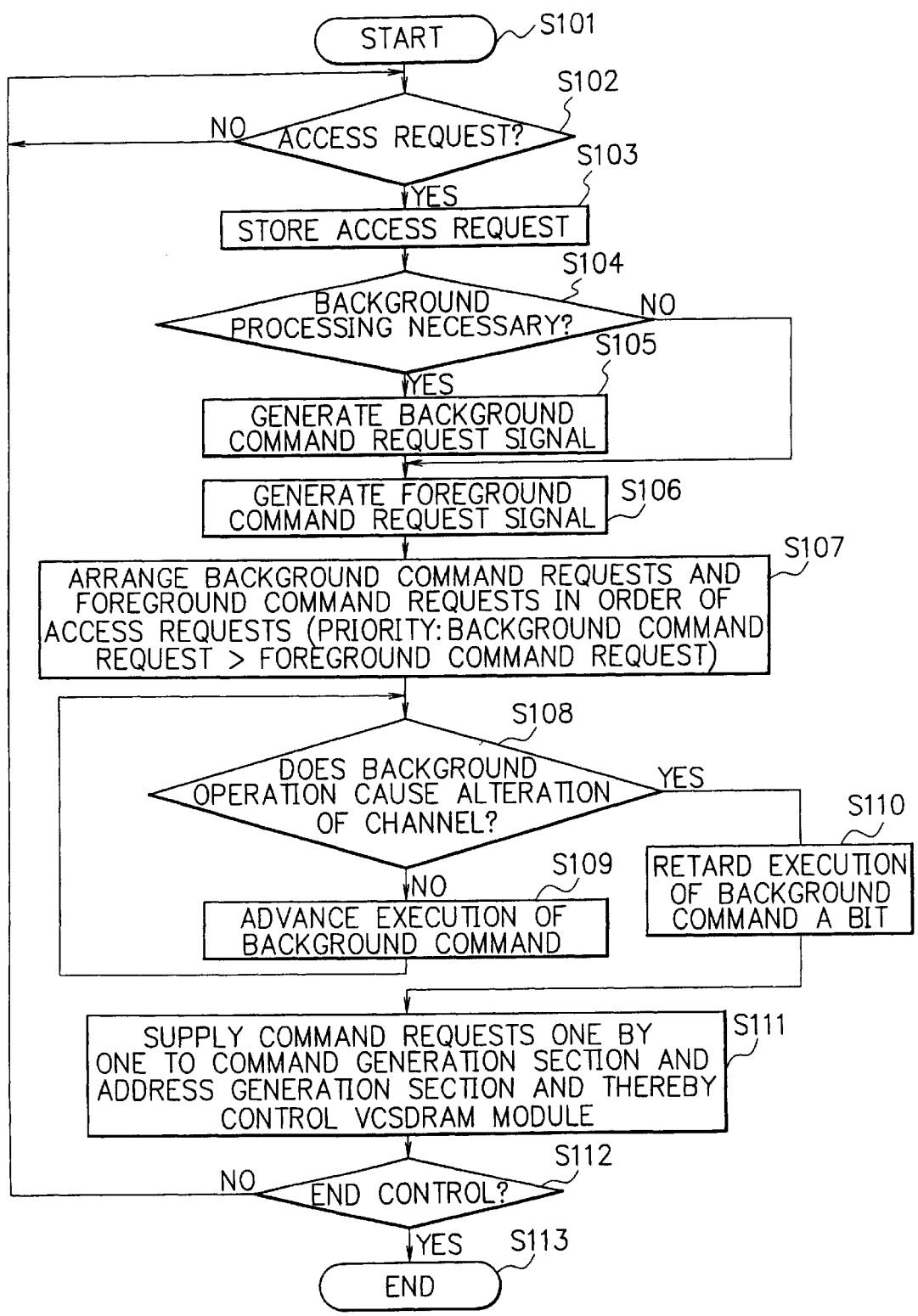

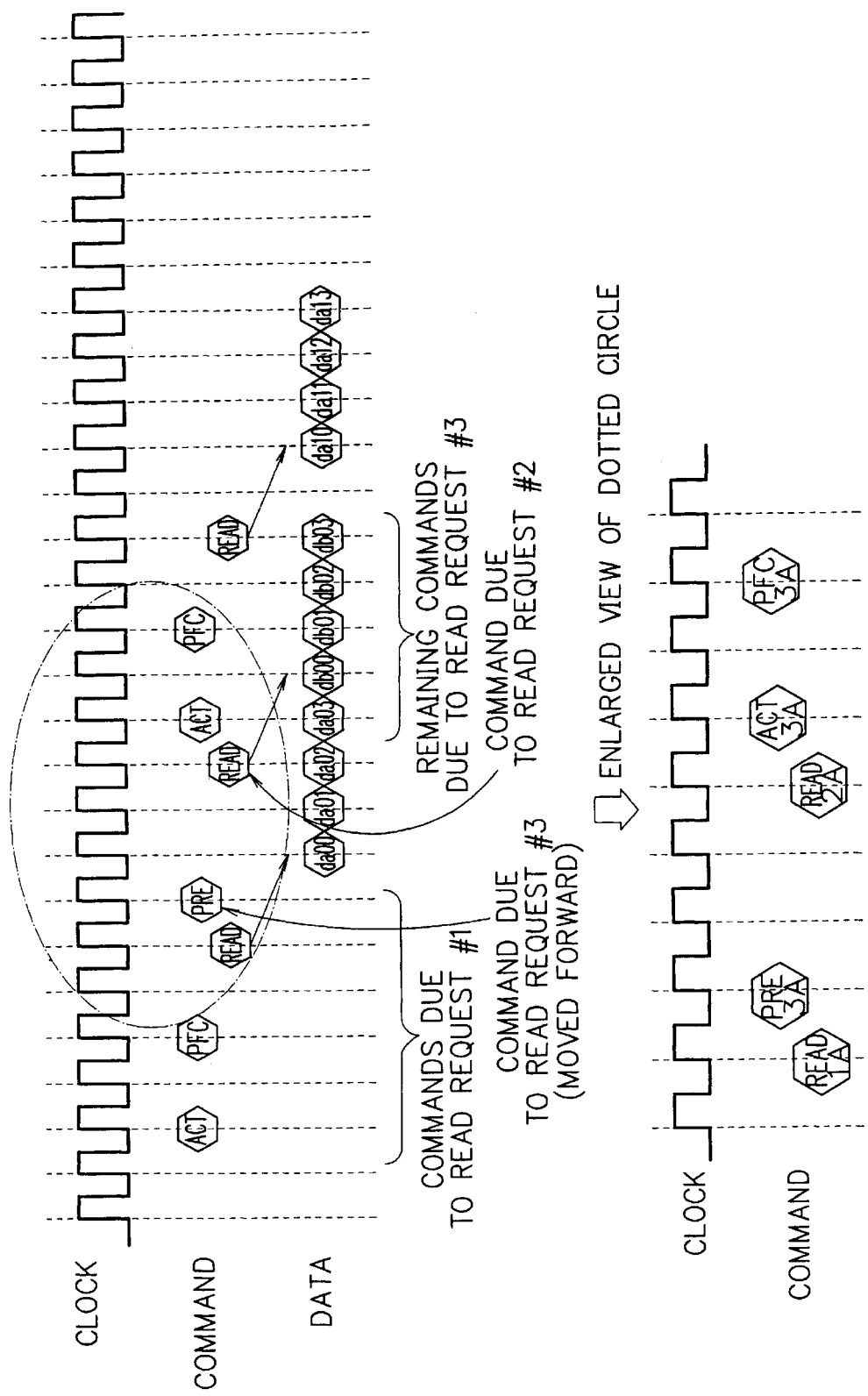

CIRCUIT AND METHOD FOR EXECUTING ACCESS CONTROL OF VIRTUAL CHANNEL MEMORY PREVENTING DETERIORATION OF DATA TRANSFER RATE

BACKGROUND OF THE INVENTION

The present invention relates to a memory control circuit and a memory control method for controlling access to memory, and in particular, to access control of virtual channel memory such as virtual channel SDRAM having a plurality of virtual channels.

DESCRIPTION OF THE RELATED ART

The demand for speeding up of synchronous memory is growing more and more these years. A technique effective for the speeding up is virtual channel synchronous DRAM (hereafter referred to as "VCSDRAM").

The VCSDRAM has several features (input/output circuitry synchronized by an external clock signal, access by use of commands, access by means of burst transfer, etc.) which are common to synchronous DRAM. However, the VCSDRAM is provided with a plurality of high-speed registers called "virtual channels" (hereafter, also referred to as "channels") in addition to ordinary SDRAM memory cells. Each of the virtual channels can be controlled separately and independently.

In VCSDRAM, read/write operation from outside is conducted directly to each channel as foreground processing, differently from the case of ordinary SDRAM. Meanwhile, intra-memory processes of the VCSDRAM such as data transfer between a memory cell and a channel, precharge of memory cells, refresh, etc. are executed as background processing which is independent of the foreground processing. Therefore, the foreground processing and the background processing can be executed concurrently in VCSDRAM.

In the following, the basic operation of VCSDRAM will be explained referring to Figures. FIG. 1 is a schematic block diagram for explaining the operation of VCSDRAM.

When data is read out from VCSDRAM 150 (read operation), data readout is executed not from memory cells of the memory cell array 151 but valid data is read out from a channel 152, differently from the case of ordinary SDRAM (hereafter, the read operation in the VCSDRAM 150 will be referred to as "channel read operation"). In the same way, when data is written into the VCSDRAM 150 (write operation), data writing is not executed directly to memory cells but valid data is written to a channel 152 (hereafter, the write operation in the VCSDRAM 150 will be referred to as "channel write operation"). Hereafter, the operation of the VCSDRAM 150 for copying part of valid data from memory cells to a channel 152 will be referred to as "prefetch operation". On the other hand, the operation of the VCSDRAM 150 for copying valid data from a channel 152 to memory cells and overwriting old data of the memory cells with the data of the channel 152 will be referred to as "restore operation".

For the completion of the write operation of the VCSDRAM 150 (that is, for the update of valid data in the memory cells), the restore operation has to be executed after the channel write operation.

Data transfer between a channel 152 and memory cells is generally executed in units of data transfer minimum units which are called "segments". The size of each segment is generally set to 1/4 of a row address size (the size of each row in the address space).

In the read operation, when valid data exists in a channel 152 (hereafter called "channel hit"), the channel read operation is executed by a memory controller. Such operation will hereafter be called "hit A read".

When valid data does not exist in a channel 152 (hereafter called "channel miss") and the row address of the valid data in the memory cells has been in "Active Standby" status, the valid data is first transferred to the channel 152 by the prefetch operation and thereafter the channel read operation is executed. Such operation will hereafter be referred to as "hit B read".

When the "channel miss" occurred and a row address that is different from a row address where the valid data exists has been in the Active Standby status (hereafter called "row miss"), the status of the row address where the valid data exists is turned to the Active Standby status, the valid data is transferred to the channel 152 by the prefetch operation, and thereafter the channel read operation is executed. Such operation will hereafter be referred to as "miss read".

In the case of "miss read", if another background operation (operation which is executed as background processing) is during execution, the execution of the prefetch operation and the channel read operation have to be suspended until the background operation is completed. Therefore, such a wait for the completion of background operation in the case of "miss read" etc. causes the delay of newly occurring access.

In the following, the operation of a conventional memory controller in the case of "channel miss" will be explained referring to FIGS. 2 and 3. FIG. 2 is a timing chart showing the operation of the conventional memory controller when access requests occurred. FIG. 3 is a schematic block diagram showing an example of the composition of a VCSDRAM module which is controlled by the conventional memory controller.

The timing chart of FIG. 2 shows a case where three memory access requests are supplied from memory masters 130. The three memory access requests will be assumed to be read requests, and the three read requests will be referred to as "read request #1", "read request #2" and "read request #3" in order of occurrence. A memory row address and a segment that occur in the read request #1 will be described as "Row1" and "Seg1". In the same way, memory row addresses and segments that occur in the read requests #2 and #3 will be described as "Row2", "Seg2", "Row3" and "Seg3", respectively. Further, column addresses that occur in the read requests #1, #2 and #3 will be described as "Col1", "Col2" and "Col3", respectively.

It is assumed that the read requests #1 and #2 designate the same memory row address, the same segment and different column addresses. The read request #3 is assumed to designate access to a row address that is different from that of the read requests #1 and #2. Further, it is assumed that each memory cell of the VCSDRAM module is in "IDLE status" (that is, neither bank nor channel is active).

First, for the read request #1, the conventional memory controller (which knows that the current status of the VCSDRAM module is the IDLE status) supplies the memory row address "Row1" to the memory (VCSDRAM module) by use of an ACT (bank active) command, turns a bank A of the memory to the Active Standby status, gives "Seg1" to the memory by use of a PFC (prefetch) command, and thereby transfers valid data to a channel #1. Thereafter, the conventional memory controller supplies the column address "Col1" to the memory by use of a READ (channel read) command and thereby data #1 (da00~da03) are read out from the channel #1, thereby the memory read operation for the read request #1 is completed.

Subsequently, when the read request #2 is supplied, the conventional memory controller judges that it is "channel hit" since the read requests #1 and #2 designate the same memory row address, the same segment and different column addresses. Therefore, the conventional memory controller issues a READ command to the channel #1, supplies the column address "Col2", and thereby reads data #2 (db00~db03) from the channel #1 (that is, executes the aforementioned "hit A read"), thereby the memory read operation for the read request #2 is completed.

Finally, in the case of the read request #3, valid data does not exist in a channel, and a row address that is in the Active Standby status is different from a row address where valid data for the read request #3 exists. Therefore, the case is "row miss". The conventional memory controller first turns the bank A (which is currently in the Active Standby status) into IDLE status by use of a PRE (precharge) command. Subsequently, the conventional memory controller supplies the memory row address "Row3" to the memory by use of an ACT command, turns a bank B of the memory to the Active Standby status, gives "Seg3" to the memory by use of a PFC command, and thereby transfers valid data to a channel #2. Thereafter, the conventional memory controller supplies the column address "Col3" to the memory by issuing a READ command and thereby reads data #3 (da10~da13) from the channel #2, thereby the memory read operation for the read request #3 is completed.

As described above, the conventional memory controller conducts the accesses to the virtual channel memory in order of access requests (that is, in order of arrival of the access requests). Therefore, there are cases where the execution of memory access takes long time (in the case of "channel miss" etc.) due to the wait which is caused by background operation (prefetch etc.) as seen in FIG. 2.

SUMMARY OF THE INVENTION

It is therefore the primary object of the present invention to provide a memory control circuit and a memory control method for executing memory control of virtual channel memory such as VCSDRAM, by which command sequence (the order of execution of commands) is optimized for preventing the deterioration of data transfer rate and thereby efficient use of the virtual channel memory is realized.

In accordance with a first aspect of the present invention, there is provided a memory control circuit for executing access control of a virtual channel memory module, comprising an access request reception means (10), an access request storage means (20), a status comparison means (30), a preceding command control means (50), a state control means (40), and a command/address generation means (60, 70). The access request reception means receives access requests which are supplied from memory masters (3). The access request storage means stores the access requests received by the access request reception means (10) and generates a foreground command request signal for each access request. The status comparison means (30) compares each access request with the current status of the virtual channel memory module. The preceding command control means (50) generates a background command request signal for each access request if necessary for the execution of the access request based on the comparison executed by the status comparison means (30). The state control means (40) receives the foreground command request signals and the background command request signals which are supplied from the access request storage means (20) and the preceding command control means (50), assigns priorities to commands according to a predetermined standard by reference to the command request signals, and thereby generates requests for controlling the issue of the commands to the virtual channel memory module. The command/address generation means (60, 70) generates the commands and addresses for the access control of the virtual channel memory module according to the requests which are supplied from the state control means (40).

In accordance with a second aspect of the present invention, in the first aspect, the access request storage means (20) includes an access request signal storage means (21), a foreground command selection means (22), and a foreground command request signal generation means (23). The access request signal storage means (21) stores access request signals which are supplied from the access request reception means (10). The foreground command selection means (22) withdraws each access request signal from the access request signal storage means (21) and selects an appropriate foreground command for each access request signal. The foreground command request signal generation means (23) generates the foreground command request signal for each access request and sends the foreground command request signal to the state control means (40) so that the foreground command selected by the foreground command selection means (22) will be issued.

In accordance with a third aspect of the present invention, in the first aspect, the status comparison means (30) includes an access request signal storage means (31), a memory status storage means (33), a memory status update means (32), a comparison means (34), a background operation judgment means (35), a background operation request signal generation means (36), and a channel validity judgment means (37). The access request signal storage means (31) stores access request signals which are supplied from the access request reception means (10). The memory status storage means (33) stores memory status information concerning the current status of the virtual channel memory module. The memory status update means (32) receives a background command occurrence signal which is supplied from the preceding command control means (50) and thereby updates the memory status information stored in the memory status storage means (33). The comparison means (34) withdraws each access request signal from the access request signal storage means (31) and compares the access request signal with the memory status information stored in the memory status storage means (33). The background operation judgment means (35) judges whether or not background operation is necessary for the execution of the access request and determines the contents of the background operation based on the result of the comparison executed by the comparison means (34). The background operation request signal generation means (36) generates a background operation request signal based on the contents of the background operation determined by the background operation judgment means (35) and sends the background operation request signal to the preceding command control means (50) if the background operation judgment means (35) judged that the background operation is necessary. The channel validity judgment means (37) judges whether a channel designated by the access request is valid or not based on the result of the comparison executed by the comparison means (34) and sends the result of the judgment to the access request storage means (20).

In accordance with a fourth aspect of the present invention, in the first aspect, the state control section (40) includes a foreground command request signal storage means (41), a background command request signal storage means (42), a command request signal ordering means (43), a command request signal supply means (44), and a memory bus monitoring means (45). The foreground command request signal storage means (41) stores the foreground command request signals which are supplied from the access request storage means (20). The background command request signal storage means (42) stores the background command request signals which are supplied from the preceding command control means (50). The command request signal ordering means (43) withdraws the foreground command request signals and the background command request signals from the foreground command request signal storage means (41) and the background command request signal storage means (42), assigns priorities to the command request signals according to a predetermined standard by associating the command request signals with corresponding access requests, and arranges and orders the command request signals in order of the priority. The command request signal supply means (44) supplies the ordered command request signals one by one to the command/address generation means (60, 70). The memory bus monitoring means (45) monitors the status of a memory bus according to signals supplied from the command/address generation means (60, 70) and informs the command request signal ordering means (43) about the memory bus status.

In accordance with a fifth aspect of the present invention, in the fourth aspect, in the ordering by the command request signal ordering means (43): the foreground command request signals and the background command request signals are arranged in order of corresponding access requests giving higher priority to a background command request signal corresponding to an access request than a foreground command request signal corresponding to the same access request, and the timing of the background operation to be executed by the background command is advanced to a point where the background operation barely avoids alteration of channel from the channel used by a foreground operation for a preceding access request, satisfying the conditions that: (A) an operation for a background command that is hitting a bank of the memory cell array should be executed with high priority in the execution of the operation; and (B) if the memory bus can not accept a background command but a foreground operation for a preceding access request is executable, the foreground operation should be executed prior to the background command.

In accordance with a sixth aspect of the present invention, in the first aspect, the memory control circuit is employed for the access control of a VCSDRAM (Virtual Channel SDRAM) module.

In accordance with a seventh aspect of the present invention, there is provided a memory control method for the access control of a virtual channel memory module. The memory control method comprises an access request storage step, a background processing necessity judgment step, a background command request signal generation step, a foreground command request signal generation step, a command request signal ordering step, a background operation advancing step, and a memory control step. In the access request storage step, each access request is stored in an access request storage means (20) when the access request is supplied from a memory master (3). In the background processing necessity judgment step, each access request is withdrawn one by one from the access request storage means (20) and it is judged whether or not background processing is necessary for the execution of the access request. In the background command request signal generation step, a background command request signal is generated for the access request if the background processing for the execution of the access request has been judged to be necessary in the background processing necessity judgment step. In the foreground command request signal generation step, a foreground command request signal is generated for the access request regardless of whether or not the background processing is necessary. In the command request signal ordering step, the background command request signals and the foreground command request signals generated for the access requests are arranged and ordered in order of the access requests so that a background command request signal for an access request will be given higher priority than a foreground command request signal for the same access request. In the background operation advancing step, the timing of a background operation to be executed by the background command is advanced to a point where the background operation barely avoids alteration of channel from the channel used by a foreground operation for a preceding access request. In the memory control step, command requests are supplied one by one to a command generation means (60) and an address generation means (70) and thereby access control of the virtual channel memory module is executed.

In accordance with an eighth aspect of the present invention, in the seventh aspect, the memory control method is employed for the access control of a VCSDRAM (Virtual Channel SDRAM) module.

In accordance with a ninth aspect of the present invention, there is provided a memory control method for the access control of a virtual channel memory module. The memory control method comprises an access request reception step, an access request storage step, a status comparison step, a preceding command control step, a state control step, and a command/address generation step. In the access request reception step, access requests which are supplied from memory masters (3) are received. In the access request storage step, the access requests received in the access request reception step are stored and a foreground command request signal is generated for each access request. In the status comparison step, each access request is compared with the current status of the virtual channel memory module. In the preceding command control step, a background command request signal is generated for each access request if necessary for the execution of the access request based on the comparison executed in the status comparison step. In the state control step, the foreground command request signals and the background command request signals generated in the access request storage step and the preceding command control step are stored, priorities are assigned to commands according to a predetermined standard by reference to the command request signals, and thereby requests for controlling the issue of the commands to the virtual channel memory module are generated. In the command/address generation step, the commands and addresses for the access control of the virtual channel memory module are generated according to the requests which are generated in the state control step.

In accordance with a tenth aspect of the present invention, in the ninth aspect, the access request storage step includes an access request signal storage step, a foreground command selection step, and a foreground command request signal generation step. In the access request signal storage step, access request signals which are generated in the access request reception step are stored in an access request signal storage means (21). In the foreground command selection step, each access request signal is withdrawn from the access request signal storage means (21) and an appropriate foreground command is selected for each access request signal. In the foreground command request signal generation step, the foreground command request signal is generated for each access request so as to be used in the state control step so that the foreground command selected in the foreground command selection step will be issued.

In accordance with an eleventh aspect of the present invention, in the ninth aspect, the status comparison step includes an access request signal storage step, a memory status storage step, a memory status update step, a comparison step, a background operation judgment step, a background operation request signal generation step, and a channel validity judgment step. In the access request signal storage step, access request signals which are generated in the access request reception step are stored in an access request signal storage means (31). In the memory status storage step, memory status information concerning the current status of the virtual channel memory module is stored in a memory status storage means (33). In the memory status update step, the memory status information stored in the memory status storage means (33) is updated according to a background command occurrence signal which is generated in the preceding command control step. In the comparison step, each access request signal is withdrawn from the access request signal storage means (31) and the access request signal is compared with the memory status information stored in the memory status storage means (33). In the background operation judgment step, it is judged whether or not background operation is necessary for the execution of the access request and the contents of the background operation are determined based on the result of the comparison executed in the comparison step. In the background operation request signal generation step, a background operation request signal is generated based on the contents of the background operation determined in the background operation judgment step so as to be used in the preceding command control step if the background operation has been judged to be necessary in the background operation judgment step. In the channel validity judgment step, it is judged whether a channel designated by the access request is valid or not based on the result of the comparison executed in the comparison step so that the result of the judgment will be used in the access request storage step.

In accordance with a twelfth aspect of the present invention, in the ninth aspect, the state control step includes a foreground command request signal storage step, a background command request signal storage step, a command request signal ordering step, a command request signal supply step, and a memory bus monitoring step. In the foreground command request signal storage step, the foreground command request signals generated in the access request storage step are stored in a foreground command request signal storage means (41). In the background command request signal storage step, the background command request signals generated in the preceding command control step are stored in a background command request signal storage means (42). In the command request signal ordering step, the foreground command request signals and the background command request signals are withdrawn from the foreground command request signal storage means (41) and the background command request signal storage means (42), priorities are assigned to the command request signals according to a predetermined standard by associating the command request signals with corresponding access requests, and the command request signals are arranged and ordered in order of the priority. In the command request signal supply step, the ordered command request signals are given one by one to the command/address generation step. In the memory bus monitoring step, the status of a memory bus is monitored according to signals generated in the command/address generation step so that the memory bus status will be used in the command request signal ordering step.

In accordance with a thirteenth aspect of the present invention, in the twelfth aspect, in the ordering which is executed in the command request signal ordering step: the foreground command request signals and the background command request signals are arranged in order of corresponding access requests giving higher priority to a background command request signal corresponding to an access request than a foreground command request signal corresponding to the same access request, and the timing of the background operation to be executed by the background command is advanced to a point where the background operation barely avoids alteration of channel from the channel used by a foreground operation for a preceding access request, satisfying the conditions that: (A) an operation for a background command that is hitting a bank of the memory cell array should be executed with high priority in the execution of the operation; and (B) if the memory bus can not accept a background command but a foreground operation for a preceding access request is executable, the foreground operation should be executed prior to the background command.

In accordance with a fourteenth aspect of the present invention, in the ninth aspect, the memory control method is employed for the access control of a VCSDRAM (Virtual Channel SDRAM) module.

In accordance with fifteenth through twenty-second aspects of the present invention, there are provided machine-readable record mediums storing programs for instructing an MPU (MicroProcessor Unit) etc. to execute the memory control methods of the seventh through fourteenth aspects of the present invention.

BRIEF DESCRIPTION OF THE DRAWINGS

The objects and features of the present invention will become more apparent from the consideration of the following detailed description taken in conjunction with the accompanying drawings, in which:

FIG. 4 is a block diagram showing the composition of a VCSDRAM control circuit as a memory control circuit in accordance with an embodiment of the present invention;

FIG. 7 is a schematic block diagram showing an example of the composition of a state control section of the VCSDRAM control circuit of FIG. 4;

FIG. 8 is a flow chart for explaining a memory control method in accordance with the embodiment of the present invention; and FIG. 9 is a timing chart showing the operation of the VCSDRAM control circuit of FIG. 4 when access requests and a "channel miss" occurred.

DESCRIPTION OF THE PREFERRED EMBODIMENTS

Figure 1:
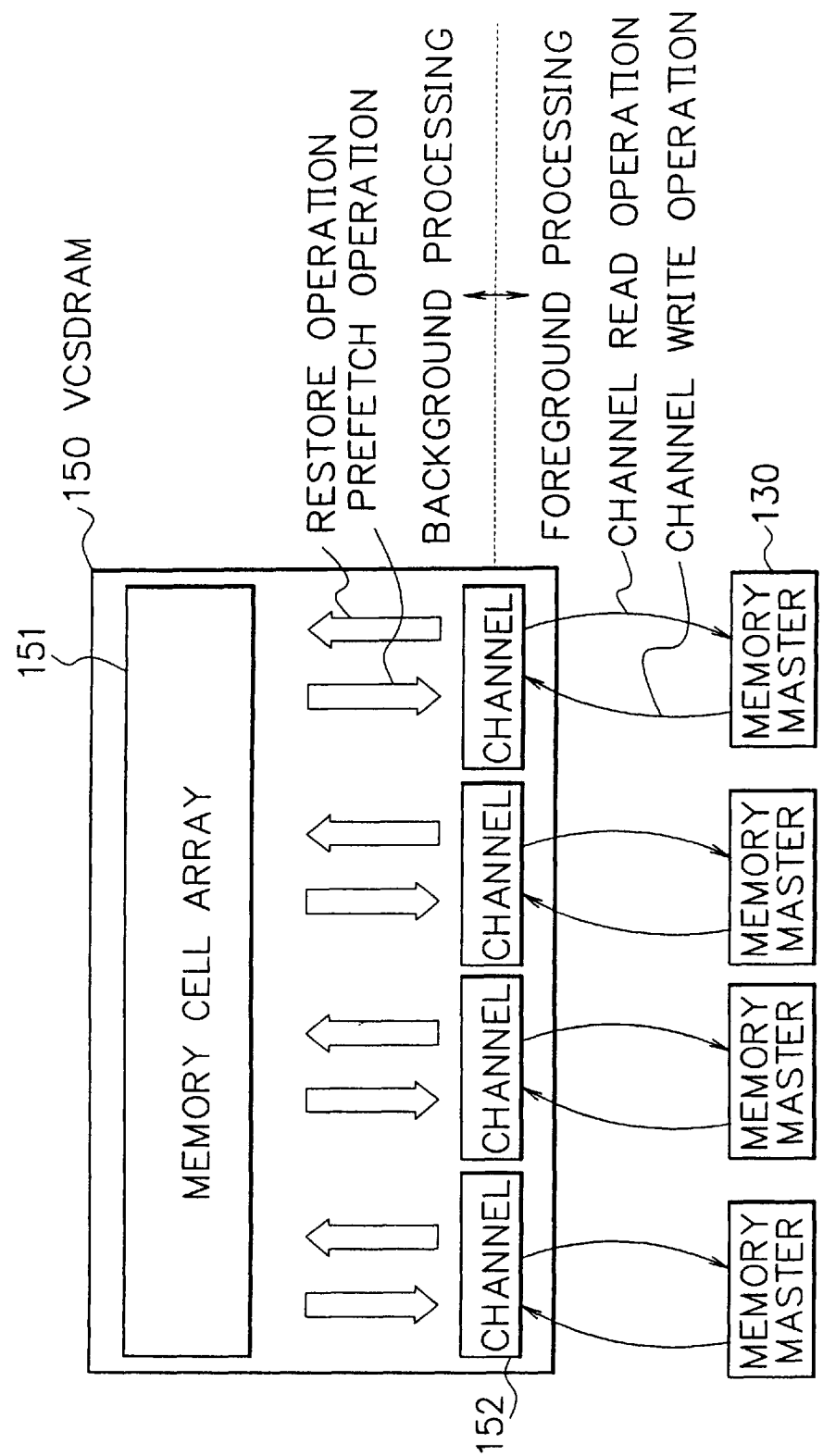
FIG. 1 is a schematic block diagram for explaining the operation of VCSDRAM.

Referring now to the drawings, a description will be given in detail of preferred embodiments in accordance with the present invention.

FIG. 4 is a block diagram showing the composition of a VCSDRAM control circuit as a memory control circuit in accordance with an embodiment of the present invention. The VCSDRAM control circuit 1 shown in FIG. 4, which is provided to a computer system as main memory and controls a plurality of VCSDRAMs (VCSDRAM module 5), includes an access request reception section 10, an access request storage section 20, a status comparison section 30, a state control section 40, a preceding command control section 50, a command generation section 60, and an address generation section 70.

The access request reception section 10 is a functional block for receiving access requests from memory masters 3 via a system bus 2 and ordering the access requests in order of arrival. From the access request reception section 10, access request signals (indicating the ordered access requests) are supplied to the access request storage section 20 and the status comparison section 30.

The access request storage section 20 is a functional block for storing and managing the access requests which are supplied from the access request reception section 10 in the order of arrival. The access request storage section 20 generates foreground command request signals for the stored access requests and sends the foreground command request signals one by one to the state control section 40.

The status comparison section 30, which is a functional block for managing the state transition of the VCSDRAM module 5, holds and manages information concerning the status of the VCSDRAM module 5 (which bank is active, which channel is active, which segment is valid, etc.). The status comparison section 30 compares each access request supplied from the access request reception section 10 with the stored information concerning the VCSDRAM module 5, judges whether background operation is necessary for the access request, and sends a background operation request signal to the preceding command control section 50 if background operation is necessary for the access request. The background operation request signal is processed by the preceding command control section 50 and thereby a background command request signal is supplied to the state control section 40.

The state control section 40 assigns priorities to necessary commands according to a predetermined standard, by reference to the background command request signals and the foreground command request signals supplied from the preceding command control section 50 and the access request storage section 20. Incidentally, for command requests (foreground command request signal, background command request signal) corresponding to the same access request supplied from the access request reception section 10, the background command request signal is processed with higher priority than the foreground command request signal. According to the command request signals to which the priorities have been assigned by the state control section 40, the command generation section 60 and the address generation section 70 are controlled to generate and issue commands and addresses to the VCSDRAM module 5. The commands and addresses generated by the command generation section 60 and the address generation section 70 are supplied to the VCSDRAM module 5 via a memory-system interface bus 4.

Figure 5:
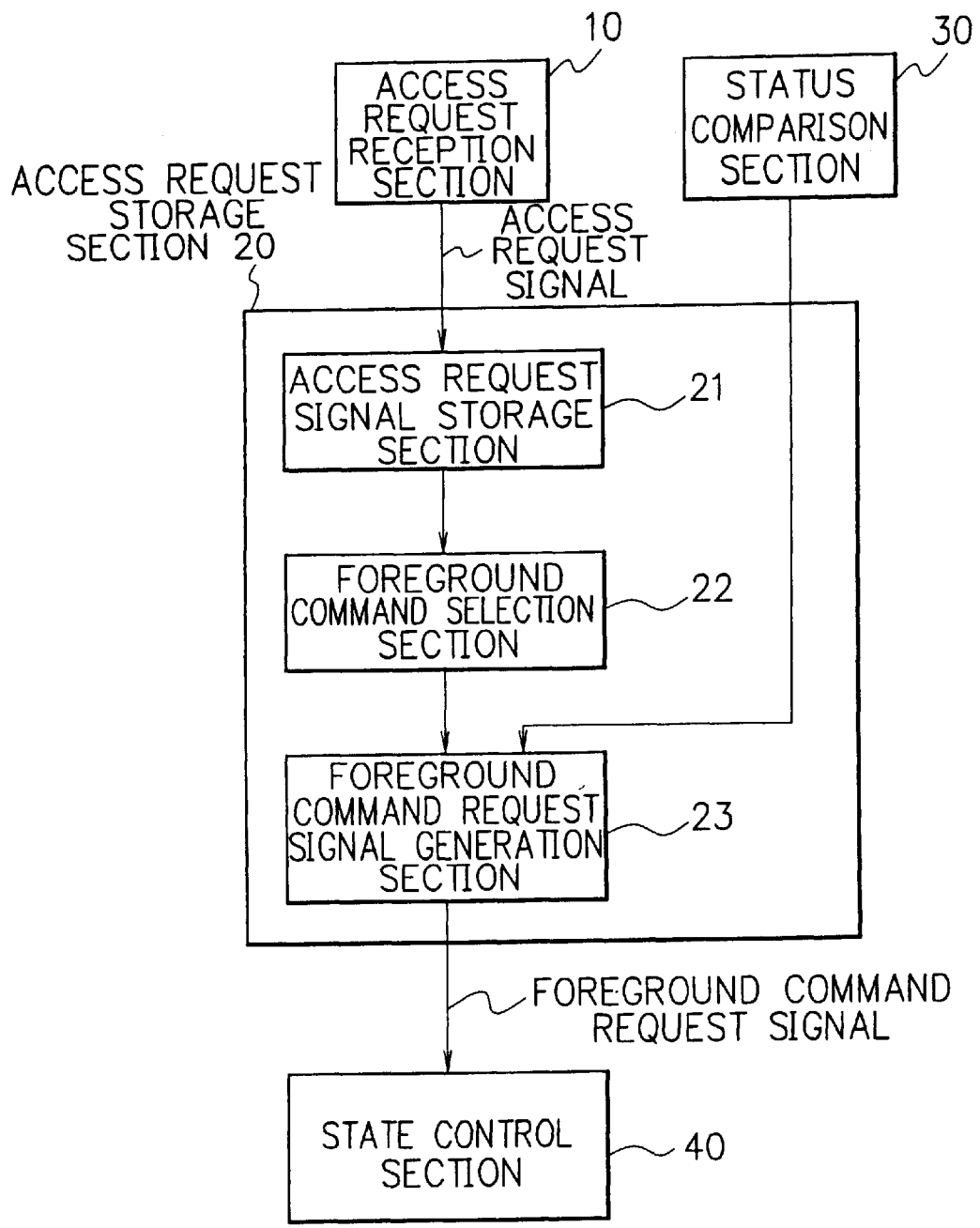
FIG. 5 is a schematic block diagram showing an example of the composition of an access request storage section of the VCSDRAM control circuit of FIG. 4.

FIG. 5 is a schematic block diagram showing an example of the composition of the access request storage section 20. The access request storage section 20 shown in FIG. 5 includes an access request signal storage section 21, a foreground command selection section 22 and a foreground command request signal generation section 23.

The access request signal storage section 21 stores the access request signals (indicating the access requests from the memory masters 3) which are supplied from the access request reception section 10. The foreground command selection section 22 withdraws each access request signal from the access request signal storage section 21 and selects an appropriate foreground command for each access request signal. The foreground command request signal generation section 23 generates the aforementioned foreground command request signal and sends the foreground command request signal to the state control section 40 so that the selected foreground command will be issued. The foreground command request signal generation section 23 receives a signal (indicating whether a channel designated by the access request is valid or not) from the status comparison section 30, and sends the foreground command request signal to the state control section 40 if the channel is valid.

Figure 6:
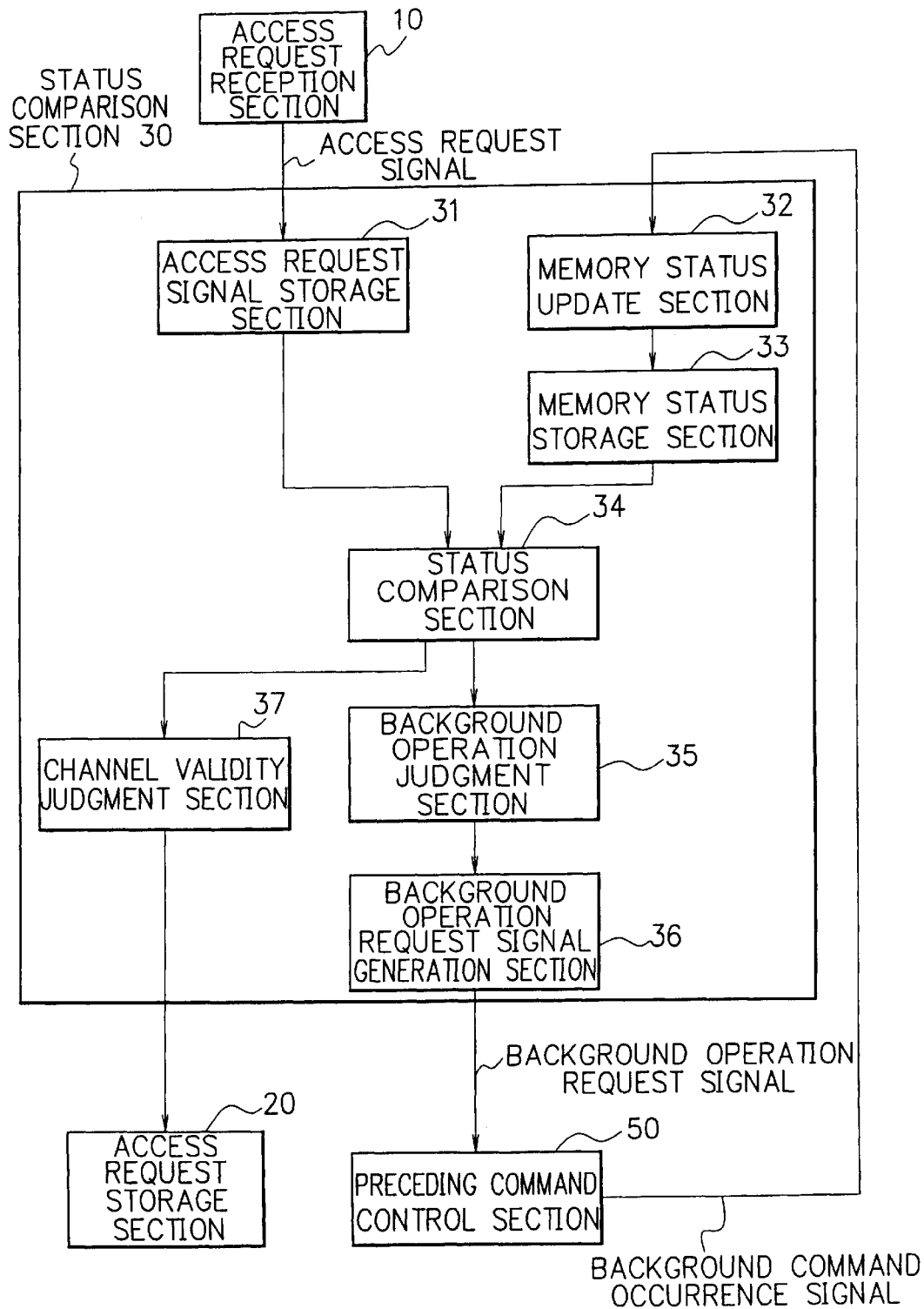
FIG. 6 is a schematic block diagram showing an example of the composition of a status comparison section of the VCSDRAM control circuit of FIG. 4.

FIG. 6 is a schematic block diagram showing an example of the composition of the status comparison section 30. The status comparison section 30 shown in FIG. 6 includes an access request signal storage section 31, a memory status update section 32, a memory status storage section 33, a status comparison section 34, a background operation judgment section 35, a background operation request signal generation section 36 and a channel validity judgment section 37.

The access request signal storage section 31 stores the access request signals (indicating the access requests from the memory masters 3) which are supplied from the access request reception section 10. The memory status storage section 33 stores information (memory status table) concerning the status of the VCSDRAM module 5. The memory status update section 32 receives the background command occurrence signal which is supplied from the preceding command control section 50 and thereby updating the memory status table of the memory status storage section 33. The status comparison section 34 withdraws each access request signal from the access request signal storage section 31 and compares the access request signal with the memory status table of the memory status storage section 33. The background operation judgment section 35 judges whether or not background operation (operation to be executed as background processing) is necessary for the execution of the access request and determines the contents of the background operation based on the result of the comparison executed by the status comparison section 34. The background operation request signal generation section 36 generates the background operation request signal (based on the contents of the background operation determined by the background operation judgment section 35) and issues the background operation request signal to the preceding command control section 50 if the background operation judgment section 35 judged that the background operation is necessary. The channel validity judgment section 37 judges whether a channel designated by the access request is valid or not based on the result of the comparison (between the access request signal and the status of the channel included in the memory status table) executed by the status comparison section 34 and sends a signal (indicating whether the channel is valid or not) to the access request storage section 20 for the foreground operation.

FIG. 7 is a schematic block diagram showing an example of the composition of the state control section 40. The state control section 40 shown in FIG. 7 includes a foreground command request signal storage section 41, a background command request signal storage section 42, a command request signal ordering section 43, a command request signal supply section 44 and a memory bus monitoring section 45.

The foreground command request signal storage section 41 stores the foreground command request signals which are supplied from the access request storage section 20. The background command request signal storage section 42 stores the background command request signals which are supplied from the preceding command control section 50. The command request signal ordering section 43 withdraws the command request signals (foreground command request signals, background command request signals) from the foreground command request signal storage section 41 and the background command request signal storage section 42, assigns priorities to the command request signals according to a predetermined standard by associating the command request signals with corresponding access requests, and arranges and orders the command request signals in order of the priority. The command request signal supply section 44 supplies the ordered command request signals (foreground command request signals, background command request signals) one by one to the command generation section 60 and the address generation section 70. The memory bus monitoring section 45 monitors the status of the memory bus according to signals supplied from the command generation section 60 and the address generation section 70, judges whether or not the foreground and background (foreground bus, background bus) are busy or not, and informs the command request signal ordering section 43 about the memory bus status.

In the ordering which is executed by the command request signal ordering section 43 of the state control section 40, the command request signals (foreground command request signals, background command request signals) are arranged in order of corresponding access requests, giving higher priority to a background command request signal (corresponding to an access request) than a foreground command request signal corresponding to the same access request, and the timing of the background operation to be executed by the background command is advanced to a point where the background operation barely avoids alteration of channel from the channel used by a preceding foreground operation (that is, to a point in time just after a point where the background operation causes alteration of channel from the channel used by a foreground operation for a preceding access request). The command request signal ordering section 43 executes the ordering satisfying the conditions that: (A) an operation for a background command that is hitting a bank of the memory cell array should be executed with high priority in the execution of the operation; and (B) if the memory bus can not accept a background command (since it has accepted another command) but a foreground operation for a preceding access request is executable, the foreground operation should be executed prior to the background command.

In the following, a memory control method in accordance with the embodiment of the present invention will be explained in detail referring to FIG. 8. FIG. 8 is a flow chart for explaining the memory control method of the embodiment.

After the memory control is started (step S101), the VCSDRAM control circuit 1 (memory control circuit) waits for an access request from a memory master 3 (step S102). When an access request is supplied from a memory master 3 ("YES" in the step S102), the access request is stored (step S103). The stored access requests are withdrawn one by one, and it is judged whether or not background processing is necessary for the execution of each access request (step S104). If background processing is necessary ("YES" in the step S104), a background command request signal is generated (step S105). Subsequently, regardless of whether background processing is necessary or not, a foreground command request signal is generated (step S106). The command request signals (background command request signals, foreground command request signals) generated in the steps S105 and S106 are ordered and arranged in order of corresponding access requests. In the ordering, a background command request signal corresponding to an access request is given higher priority than a foreground command request signal corresponding to the same access request (step S107). If the background operation (corresponding to the background command request) does not cause alteration of channel from the channel used by a preceding foreground operation ("NO" in the step S108), the timing of the execution of the background command is advanced (step S109), and the process is returned to the step S108. On the other hand, if the background operation causes alteration of channel from the channel used by a preceding foreground operation ("YES" in the step S108), the timing of the execution of the background command is retarded a bit (step S110), and the process proceeds to a step S111. The command requests (background command requests, foreground command requests) in the modified command request sequence are supplied one by one to the command generation section 60 and the address generation section 70 and thereby the access control of the VCSDRAM module 5 is conducted (step S111). Thereafter, if the memory control is not ended ("NO" in step S112), the process is returned to the step S102 and the VCSDRAM control circuit 1 waits for another access request.

Figure 2:
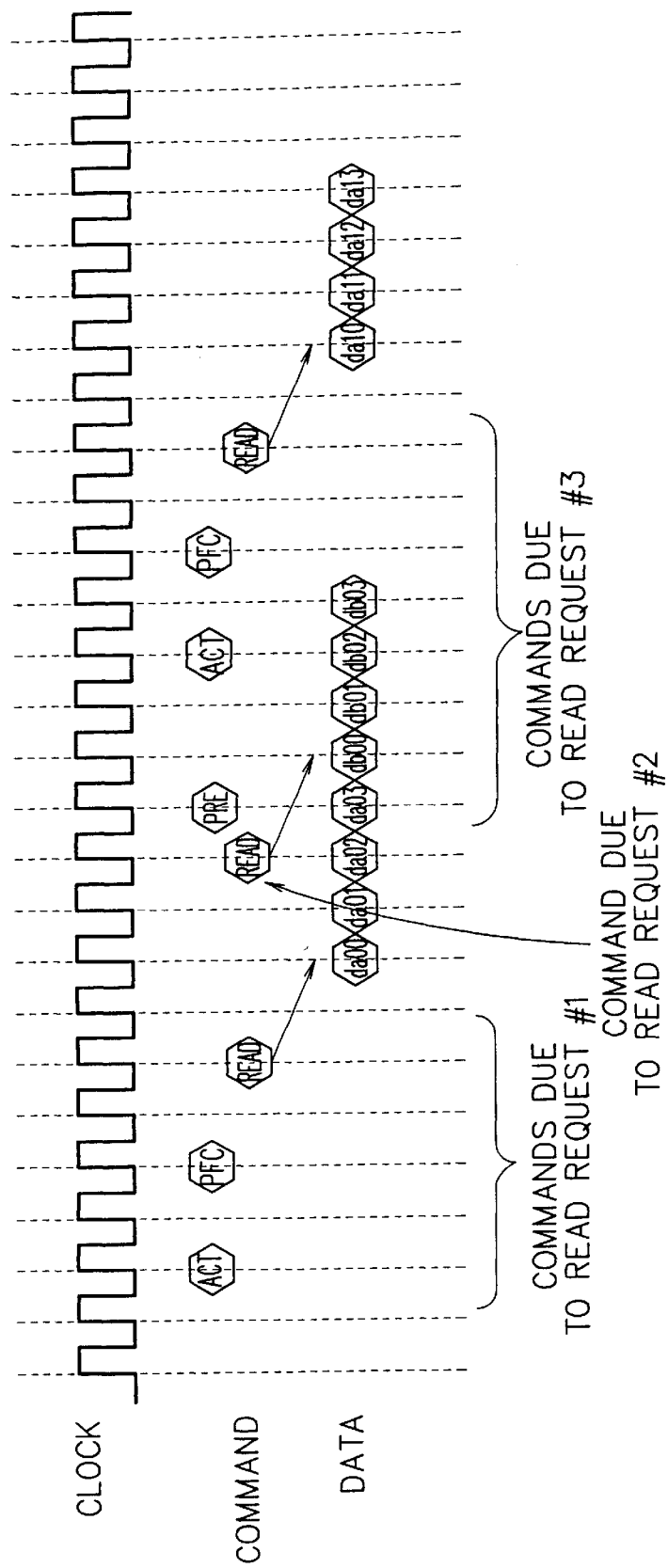
FIG. 2 is a timing chart showing the operation of a conventional memory controller when access requests occurred.
Figure 3:
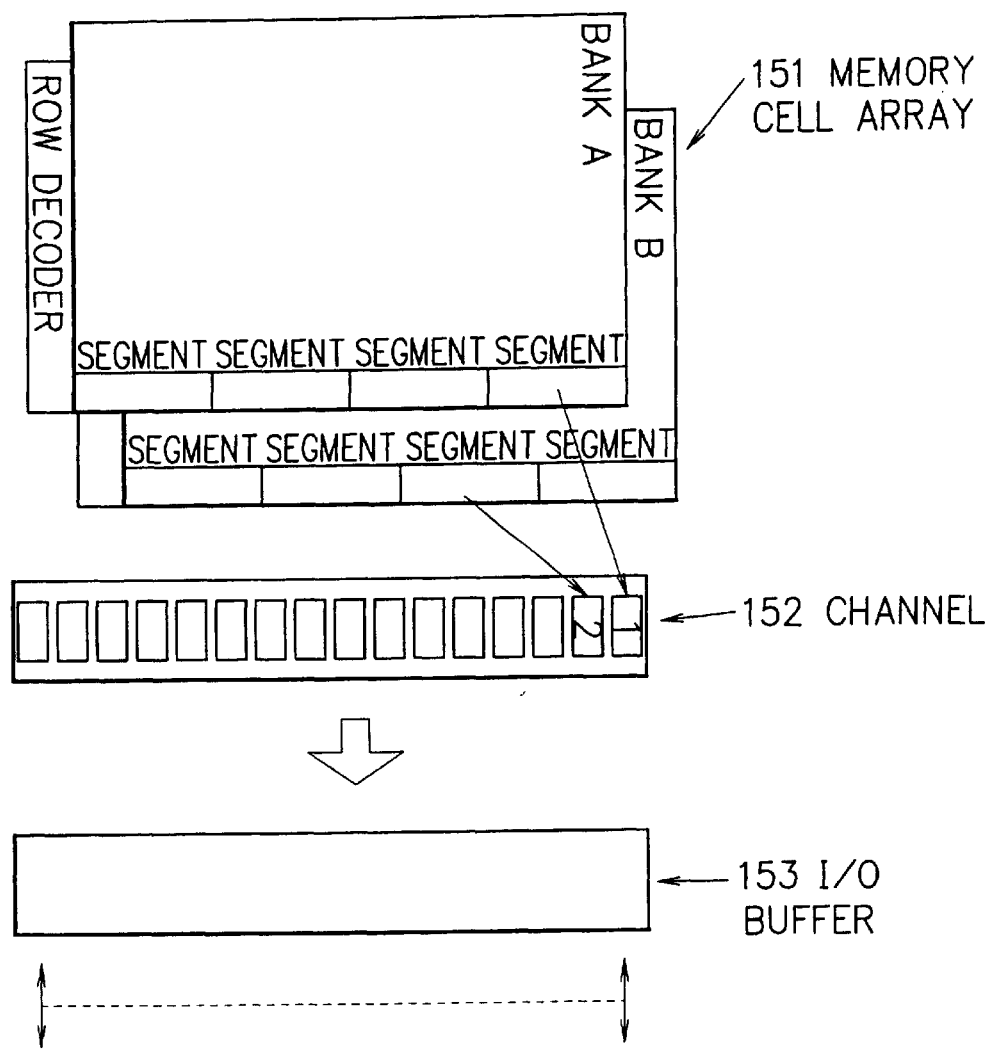
FIG. 3 is a schematic block diagram showing an example of the composition of a VCSDRAM module which is controlled by the conventional memory controller.

In the following, a concrete example of the operation of the memory control circuit of the embodiment will be explained in detail referring to FIG. 4 and FIG. 9. FIG. 9 is a timing chart showing the operation of the VCSDRAM control circuit 1 when access requests and a "channel miss" occurred. The timing chart of FIG. 9 shows a case where three memory read requests are supplied from memory masters 3, similarly to FIG. 2 which has been used for the explanation of the conventional memory controller. Explanation of basic operations, commands, etc. has been given in the description of the related art, and thus repeated description thereof is omitted here.

The three memory read requests will be referred to as "read request #1A", "read request #2A" and "read request #3A" in order of occurrence. Memory row addresses and segments that occur in the read requests #1A, #2A and #3A will be described as "Row1A", "Seg1A", "Row2A", "Seg2A", "Row3A" and "Seg3A", respectively. Column addresses that occur in the read requests #1A, #2A and #3A will be described as "Col1A", "Col2A" and "Col3A", respectively.

It is assumed that the read requests #1A and #2A designate the same memory row address, the same segment and different column addresses. The read request #3A is assumed to designate access to a row address that is different from that of the read requests #1A and #2A. Further, it is assumed that each memory cell of the VCSDRAM module 5 is in "IDLE status" (that is, neither bank nor channel is active). Therefore, in this case, the three read requests #1A, #2A and #3A supplied from the memory masters 3 cause a new read operation, a "channel hit" and a "channel miss", respectively.

In the case of the read request #1A, when an access request signal (corresponding to the read request #1A) is supplied from the access request reception section 10 to the status comparison section 30, the status comparison section 30 compares the access request signal with the information concerning the status of the VCSDRAM module 5 which has been stored in the status comparison section 30. Since the banks and channels have been inactive according to the information on the VCSDRAM module status, the status comparison section 30 judges that a background operation is necessary and thus sends a background operation request signal to the preceding command control section 50. The preceding command control section 50 which received the background operation request signal from the status comparison section 30 sends a background command request signal to the state control section 40 so that an ACT (bank active) command and a PFC (prefetch) command will be issued. At the same time, the status comparison section 30 updates its information concerning the VCSDRAM module status into information indicating: "Row 1A" is active; channel #1 is active; and channel #1 holds "Seg1A".

Meanwhile, the access request storage section 20 which received the access request signal from the access request reception section 10 sends a foreground command request signal to the state control section 40 so that a READ command will be issued for the read request 1A. The state control section 40 which received the background command request signal and the foreground command request signal orders the command request signals for the read request 1A in order of priority, and the ordered command request signals (background command request signal, foreground command request signal) are supplied to the command generation section 60 and the address generation section 70, thereby an "ACT1" command, a "PFC1" command, a "READ1" command and addresses are generated.

In the case of the read request #2A, when an access request signal (corresponding to the read request #2A) is supplied from the access request reception section 10 to the status comparison section 30, the status comparison section 30 compares the access request signal with the VCSDRAM module status information stored therein, similarly to the case of the read request #1A. Since the read requests #1A and #2A designate the same memory row address and the same segment (only column addresses are different), memory access for the read request #2A can be completed by executing read operation to the currently active channel #1 and no background operation is necessary. Therefore, the status comparison section 30 outputs no background operation request signal to the preceding command control section 50. Therefore, only a foreground command request signal (for issuing a READ command for the read request #2A) from the access request storage section 20 is supplied to the state control section 40, thereby a "READ2" command and addresses for the read request #2A are generated by the command generation section 60 and the address generation section 70.

In the case of the read request #3A, when an access request signal (corresponding to the read request #3A) is supplied from the access request reception section 10 to the status comparison section 30, the VCSDRAM module status information stored in the status comparison section 30 indicates: "Row 1A" is active; and "Seg1A" is active in the channel #1. The read request #3A designates "Row 3A" and "Seg3A", and thus the status comparison section 30 judges that a background operation is necessary and sends a background operation request signal to the preceding command control section 50. The preceding command control section 50 which received the background operation request signal sends a background command request signal to the state control section 40 so that a PRE (precharge) command, an ACT (bank active) command and a PFC (prefetch) command will be issued. At the same time, the status comparison section 30 updates its VCSDRAM module status information into information indicating: "Row 3A" is active; channels #1 and #2 are active; and channels #1 and #2 hold "Seg1A" and "Seg3A" respectively.

Meanwhile, similarly to the case of the read request #1A, the access request storage section 20 which received the access request signal from the access request reception section 10 sends a foreground command request signal to the state control section 40 so that a READ command will be issued for the read request 3A. The state control section 40 which received the background command request signal and the foreground command request signal orders the command request signals for the read request 3A in order of priority, and the ordered command request signals (background command request signal, foreground command request signal) are supplied to the command generation section 60 and the address generation section 70, thereby a "PRE3" command, an "ACT3" command, a "PFC3" command, a "READ3" command and addresses are generated.

The state control section 40 gives higher priority to background operation in comparison with foreground operation for the same access request. Therefore, in the case of the read request #1A, the "ACT1" command, the "PFC1" command and thereafter the "READ1" command are executed. The "READ2" command (foreground operation) for the read request #2A can not be executed until the "READ1" command (foreground operation) is completed.

Since the state control section 40 has the function of moving background processing forward, the "PRE3" command (background operation) for the read request #3A is executed prior to the "READ2" command (foreground operation). After the "PRE3" command is executed (after the execution of the "READ1" command), the "READ2" command is executed. Thereafter, remaining background commands for the read request #3A ("ACT3" command, "PFC3" command) are executed and thereafter the "READ3" command is executed, thereby memory access for the read requests #1A, #2A and #3A are completed.

In the above example, a background operation ("PRE3" command) for a read request (read request #3A) is moved forward so as to be executed prior to a foreground operation ("READ2" command) for the preceding read request (read request #2A).

As described above, in the memory control circuit and the memory control method in accordance with the embodiment of the present invention, foreground operations and background operations are handled separately. When a background operation occurred, the background operation is executed with high priority, thereby the command sequence is optimized. A background operation for an access request is moved forward so as to be executed simultaneously with a foreground operation for a preceding access request, thereby foreground operations for access requests can be executed successively. Therefore, the penalty (wait) due to background operation in the case of "channel miss" etc. can be reduced, thereby the deterioration of data transfer rate of VCSDRAM is prevented and thereby efficient use of the VCSDRAM is realized.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A memory control circuit for executing access control of a virtual channel memory module, comprising:
    an access request receiver for receiving access requests which are supplied from memory masters;
    an access request storage section for storing said access requests received by said access request receiver and generating a foreground command request signal for each access request;
    a status comparator for comparing each access request with the current status of said virtual channel memory module;
    a preceding command controller for generating a background command request signal for each access request if necessary for the execution of said access request based on the comparison executed by said status comparator;
    a state controller for receiving said foreground command request signals and said background command request signals which are supplied from said access request storage section and said preceding command controller, assigning priorities to commands according to a predetermined standard by reference to said command request signals, and thereby generating requests for controlling the issue of said commands to said virtual channel memory module; and
    a command/address generator for generating said commands and addresses for the access control of said virtual channel memory module according to said requests which are supplied from said state controller,
    wherein said access request storage section includes:
        an access request signal storage section for storing access request signals which are supplied from said access request receiver;
        a foreground command selector for withdrawing each access request signal from said access request signal storage section and selecting an appropriate foreground command for each access request signal; and
        a foreground command request signal generator for generating said foreground command request signal for each access request and sending said foreground command request signal to said state controller so that said foreground command selected by said foreground command selector will be issued.

2. A memory control circuit as claimed in claim 1, wherein said status comparator includes:
    an access request signal storage section for storing access request signals which are supplied from said access request receiver;
    a memory status storage section for storing memory status information concerning the current status of said virtual channel memory module;
    a memory status update module for receiving a background command occurrence signal which is supplied from said preceding command controller and thereby updating said memory status information stored in said memory status storage section;
    a comparator for withdrawing each access request signal from said access request signal storage section and comparing said access request signal with said memory status information stored in said memory status storage section;
    a background operation judgment module for judging whether or not background operation is necessary for the execution of said access request and determining the contents of said background operation based on the result of the comparison executed by said comparator;
    a background operation request signal generator for generating a background operation request signal based on said contents of said background operation determined by said background operation judgment module and sending said background operation request signal to said preceding command controller if said background operation judgment module judged that said background operation is necessary; and
    a channel validity judgment module for judging whether a channel designated by said access request is valid or not based on the result of the comparison executed by said comparator and sending the result of the judgment to said access request storage section.

3. A memory control circuit as claimed in claim 1, wherein said memory control circuit is employed for said access control of a VCSDRAM (Virtual Channel SDRAM) module.

4. A memory control circuit as claimed in claim 1, wherein said state controller comprises:
    a foreground command request signal storage section for storing said foreground command request signals which are supplied from said access request storage section;
    a background command request signal storage section for storing said background command request signals which are supplied from said preceding command controller;
    a command request signal ordering module for withdrawing said foreground command request signals and said background command request signals from said foreground command request signal storage section and said background command request signal storage section, assigning priorities to said command request signals according to a predetermined standard by associating said command request signals with corresponding access requests, and arranging and ordering said command request signals in order of said priority;
    a command request signal generator for supplying said ordered command request signals one by one to said command/address generator; and
    a memory bus monitor for monitoring the status of a memory bus according to signals supplied from said command/address generator and informing said command request signal ordering module about said memory bus status.

5. A memory control circuit as claimed in claim 4, wherein in said ordering by said command request signal ordering module:

said foreground command request signals and said background command request signals are arranged in order of corresponding access requests giving higher priority to a background command request signal corresponding to an access request than a foreground command request signal corresponding to the same access request, and the timing of said background operation to be executed by said background command is advanced to a point where said background operation barely avoids alteration of channel from the channel used by a foreground operation for a preceding access request, satisfying the conditions that:
- (A) an operation for a background command that is hitting a bank of the memory cell array should be executed with high priority in the execution of said operation; and
- (B) if the memory bus can not accept a background command but a foreground operation for a preceding access request is executable, said foreground operation should be executed prior to said background command.

6. A memory control method for the access control of a virtual channel memory module, comprising:
- storing each access request in an access request storage section when said access request is supplied from a memory master;
- withdrawing each access request one by one from said access request storage section;
- judging whether or not background processing is necessary for the execution of said access request;
- generating a background command request signal for said access request if said background processing for the execution of said access request has been judged to be necessary;
- generating a foreground command request signal for said access request regardless of whether or not said background processing is necessary;
- arranging and ording said background command request signals and said foreground command request signals generated for said access requests in order of said access requests so that a background command request signal for an access request will be given higher priority than a foreground command request signal for the same access request;
- advancing a timing of a background operation to be executed by said background command is advanced to a point where said background operation barely avoids alteration of channel from the channel used by a foreground operation for a preceding access request; and
- supplying command requests one by one to a command generator and an address generator, thereby executing access control of said virtual channel memory module.

7. A memory control method as claimed in claim 6, wherein said memory control method is employed for said access control of a VCSDRAM (Virtual Channel SDRAM) module.

8. A memory control method for the access control of a virtual channel memory module, said method comprising:
- receiving access requests which are supplied from memory masters;
- storing said access requests received and generating a foreground command request signal for each access request;
- comparing each access request with the current status of said virtual channel memory module;
- generating a background command request signal for each access request if necessary for the execution of said access request based on said comparing;
- storing said foreground command request signals and said background command request signals;
- assigning priorities to commands according to a predetermined standard by reference to said command request signals, thereby generating requests for controlling the issue of said commands to said virtual channel memory module; and
- generating commands and addresses for the access control of said virtual channel memory module according to said generated requests, wherein said access request storing comprises:
- storing access request signals which are generated in an access request signal storage section;
- withdrawing each access request signal from said access request signal storage section and selecting an appropriate foreground command for each access request signal; and
- generating a foreground command request signal for each access request so that said selected foreground command will be issued.

9. A memory control method as claimed in claim 8, wherein said comparing status comprises:
- storing said generated access request signals in an access request signal storage section;
- storing memory status information concerning the current status of said virtual channel memory module in a memory status storage section;
- updating memory status information stored in said memory status storage section according to a background command occurrence signal which is previously generated;
- withdrawing each access request signal from said access request signal storage section and comparing said access request signal with said memory status information stored in said memory status storage section;
- judging whether or not background operation is necessary for the execution of said access request and determining the contents of said background operation based on the result of the previously-executed comparison;
- generating a background operation request signal based on said background operation judging if said background operation has been judged to be necessary; and
- judging whether a channel designated by said access request is valid or not based on the result of said comparing so that the result of the judgment will be used in said access request storing.

10. A memory control method as claimed in claim 8, wherein said memory control method is employed for said access control of a VCSDRAM (Virtual Channel SDRAM) module.

11. A memory control method as claimed in claim 8, wherein said state controlling comprises:
- storing said generated foreground command request signals in a foreground command request signal storage section;
- storing said generated background command request signals in a background command request signal storage section;
- withdrawing said foreground command request signals and said background command request signals from said foreground command request signal storage section and said background command request signal storage section, assigning priorities to said command request signals according to a predetermined standard by associating said command request signals with corresponding access requests, and arranging and ordering said command request signals in order of said priority;

supplying said ordered command request signals one by one for said generating of commands/addresses; and monitoring the status of a memory bus according to generated command/address signals so that said memory bus status will be used in said ordering of command request signals.

12. A memory control method as claimed in claim 11, wherein in said ordering:

said foreground command request signals and said background command request signals are arranged in order of corresponding access requests giving higher priority to a background command request signal corresponding to an access request than a foreground command request signal corresponding to the same access request, and the timing of said background operation to be executed by said background command is advanced to a point where said background operation barely avoids alteration of channel from the channel used by a foreground operation for a preceding access request, satisfying the conditions that:

(A) an operation for a background command that is hitting a bank of the memory cell array should be executed with high priority in the execution of said operation; and (B) if the memory bus can not accept a background command but a foreground operation for a preceding access request is executable, said foreground operation should be executed prior to said background command.

13. A machine-readable record medium storing a program for instructing an MPU (MicroProcessor Unit) to execute a memory control method for the access control of a virtual channel memory module, said memory control method comprising:

storing each access request in an access request storage section when said access request is supplied from a memory master;

withdrawing each access request one by one from said access request storage section and judging whether or not background processing is necessary for the execution of said access request;

generating a background command request signal for said access request if said background processing for the execution of said access request has been judged to be necessary;

generating a foreground command request signal for said access request regardless of whether or not said background processing is necessary;

arranging and ordering said background command request signals and said foreground command request signals generated for said access requests in order of said access requests so that a background command request signal for an access request will be given higher priority than a foreground command request signal for the same access request;

advancing a timing of a background operation to be executed by said background command to a point where said background operation barely avoids alteration of channel from the channel used by a foreground operation for a preceding access request; and supplying command requests one by one to a command generator and an address generator, thereby executing access control of said virtual channel memory module.

14. A machine-readable record medium as claimed in claim 13, wherein said memory control method is employed for said access control of a VCSDRAM (Virtual Channel SDRAM) module.

15. A machine-readable record medium storing a program for instructing an MPU (MicroProcessor Unit) to execute a memory control method for the access control of a virtual channel memory module, said memory control method comprising:

receiving access requests which are supplied from memory masters;

storing said received access requests and generating a foreground command request signal for each access request;

comparing each access request with a current status of said virtual channel memory module;

generating a background command request signal for each access request if necessary for the execution of said access request based on said status comparing;

storing said generated foreground command request signals and said background command request signals, assigning priorities to commands according to a predetermined standard by reference to said command request signals, thereby generating requests for controlling the issue of said commands to said virtual channel memory module; and generating commands and addresses for the access control of said virtual channel memory module according to said generated requests, wherein said access request stoma comprises:

storing access request signals which are generated in said access request receiving in an access request signal storage section;

withdrawing each access request signal from said access request signal storage section and selecting an appropriate foreground command for each access request signal; and generating said foreground command request signal for each access request so as to be used in said issuing said selected foreground command.

16. A machine-readable record medium as claimed in claim 15, said status comparing comprises:

storing access request signals which are generated in said access request receiving in an access request signal storage section;

storing memory status information concerning the current status of said virtual channel memory module in a memory status storage section;

updating said memory status information stored in said memory status storage section according to a background command occurrence signal which is previously generated;

withdrawing each access request signal from said access request signal storage section and comparing said access request signal with said memory status information stored in said memory status storage section;

judging whether or not background operation is necessary for the execution of said access request and determining the contents of said background operation based on the result of said comparing;

generating a background operation request signal based on said contents of said determined background operation to be used in said preceding command control step if said background operation has been judged to be necessary; and judging whether a channel designated by said access request is valid or not based on the result of the comparison so that the result of the judgment will be used in said access request storing.

17. A machine-readable record medium as claimed in claim 15, wherein said memory control method is employed for said access control of a VCSDRAM (Virtual Channel SDRAM) module.

18. A machine-readable record medium as claimed in claim 15, wherein said storing said required signals and assigning priorities comprises:

storing said foreground command request signals in a foreground command request signal storage section;

storing said background command request signals in a background command request signal storage section;

withdrawing said foreground command request signals and said background command request signals from said foreground command request signal storage section and said background command request signal storage section, assigning priorities to said command request signals according to a predetermined standard by associating said command request signals with corresponding access requests, and arranging and ordering said command request signals in order of said priority;

giving said ordered command request signals one by one to said command/address generating; and monitoring a status of a memory bus so that said memory bus status will be used in said command request signal ordering.

19. A machine-readable record medium as claimed in claim 18, wherein in said ordering:

said foreground command request signals and said background command request signals are arranged in order of corresponding access requests giving higher priority to a background command request signal corresponding to an access request than a foreground command request signal corresponding to an access request than a foreground command request signal corresponding to the same access request, and the timing of said background operation to be executed by said background command is advanced to a point where said background operation barely avoids alteration of channel from the channel used by a foreground operation for a preceding access request, satisfying the conditions that:

(A) an operation for a background command that is hitting a bank of the memory cell array should be executed with high priority in the execution of said operation; and (B) if the memory bus can not accept a background command but a foreground operation for a preceding access request is executable, said foreground operation should be executed prior to said background command.

\* \* \* \* \*